(12) United States Patent
Uehara

(10) Patent No.: US 11,028,746 B2
(45) Date of Patent: Jun. 8, 2021

(54) WORK VEHICLE INCLUDING DIESEL PARTICULATE FILTER (DPF) REGENERATION CONTROL

(71) Applicant: Yanmar Co., Ltd., Osaka (JP)

(72) Inventor: Dai Uehara, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 16/635,486

(22) PCT Filed: Jul. 20, 2018

(86) PCT No.: PCT/JP2018/027309
§ 371 (c)(1),
(2) Date: Jan. 30, 2020

(87) PCT Pub. No.: WO2019/026648
PCT Pub. Date: Feb. 7, 2019

(65) Prior Publication Data
US 2021/0087958 A1 Mar. 25, 2021

(30) Foreign Application Priority Data
Jul. 31, 2017 (JP) .............................. JP2017-147715

(51) Int. Cl.
*F01N 3/023* (2006.01)
*F01N 3/20* (2006.01)
(Continued)

(52) U.S. Cl.
CPC ......... *F01N 3/023* (2013.01); *B01D 46/0063* (2013.01); *B01D 53/9418* (2013.01);
(Continued)

(58) Field of Classification Search
CPC ...... F01N 3/023; F01N 3/0253; F01N 3/2066; F01N 3/208; F01N 2250/02;
(Continued)

(56) References Cited

U.S. PATENT DOCUMENTS 8,156,729 B2* 4/2012 Sun .......................... F01N 3/18
60/277
2015/0143801 A1* 5/2015 Asaura .................... F01N 3/208
60/286
(Continued)

FOREIGN PATENT DOCUMENTS

JP 2009-127521 A 6/2009
JP 2013-160104 A 8/2013
(Continued)

OTHER PUBLICATIONS

International Search Report dated Sep. 18, 2018 issued in corresponding PCT Application PCT/JP2018/027309.

*Primary Examiner* — Jorge L Leon, Jr.
(74) *Attorney, Agent, or Firm* — Norton Rose Fulbright US LLP

(57) ABSTRACT

A work vehicle including a DPF system configured to collect particulate matter contained in exhaust gas from an engine; an SCR system configured to add, to the exhaust gas from the engine a reductant stored in a reductant storage tank to reduce nitrogen oxide contained in the exhaust gas; and a control unit capable of executing a DPF renewal control whereby particulate matter collected and deposited in the DPF system is burned and removed by using the exhaust gas from the engine and an SCR reference operation restricting control to restrict an operating condition of the engine. The SCR reference operation restricting control is executed when an amount of the reductant stored in the reductant storage tank is a preset amount or less, or when an abnormality occurs in the SCR system. The control unit prefer- (Continued)

entially executes the DPF renewal control over the SCR reference operation restricting control.

5 Claims, 12 Drawing Sheets

(51) Int. Cl.
    *F01N 3/08*     (2006.01)
    *B01D 53/94*     (2006.01)
    *B01D 46/00*     (2006.01)
    *F01N 3/025*     (2006.01)

(52) U.S. Cl.
    CPC ..... *B01D 53/9431* (2013.01); *B01D 53/9477* (2013.01); *B01D 53/9495* (2013.01); *F01N 3/0842* (2013.01); *F01N 3/208* (2013.01); *F01N 3/2066* (2013.01); *B01D 2255/1021* (2013.01); *B01D 2255/904* (2013.01); *B01D 2255/915* (2013.01); *B01D 2279/30* (2013.01); *F01N 3/0253* (2013.01); *F01N 2250/02* (2013.01); *F01N 2430/085* (2013.01); *F01N 2550/02* (2013.01); *F01N 2570/14* (2013.01); *F01N 2590/08* (2013.01); *F01N 2610/02* (2013.01); *F01N 2610/03* (2013.01); *F01N 2610/146* (2013.01); *F01N 2610/1406* (2013.01); *F01N 2900/1404* (2013.01); *F01N 2900/1606* (2013.01); *F01N 2900/1621* (2013.01); *F01N 2900/1814* (2013.01)

(58) Field of Classification Search
    CPC ........... F01N 2430/085; F01N 2550/02; F01N 2570/14; F01N 2590/08; F01N 2610/02; F01N 2610/03; F01N 2610/1406; F01N 2610/146; F01N 2900/1404; F01N 2900/1606; F01N 2900/1621; F01N 2900/1814; B01D 46/0063; B01D 53/9418; B01D 53/9495; B01D 2279/30
    USPC ......... 60/285, 286, 295, 297, 301, 303, 311, 60/320
    See application file for complete search history.

(56) References Cited

U.S. PATENT DOCUMENTS

2017/0043295 A1*   2/2017  Minezawa ................ F01N 3/08
2017/0051693 A1*   2/2017  Szailer ................ F02D 41/1463

FOREIGN PATENT DOCUMENTS

| JP | 2015-175264 A | 10/2015 |
|----|---------------|---------|
| JP | 2016-078600 A | 5/2016 |
| JP | 2016-130518 A | 7/2016 |
| WO | 2015/025535 A1 | 2/2015 |
| WO | 2015/025537 A | 2/2015 |
| WO | 2016/076271 A1 | 5/2016 |

* cited by examiner

FIG. 4

| DPF RENEWAL CONTROL | AIR-INTAKE AMOUNT CONTROL | FUEL CONTROL | | | | ENGINE ROTATIONAL SPEED CONTROL | WORKABILITY |
|---|---|---|---|---|---|---|---|
| | | PRE-INJECTION | MAIN INJECTION | AFTER-INJECTION | POST-INJECTION | | |
| SELF-RENEWAL CONTROL (NON-POST-INJECTION DPF RENEWAL CONTROL) | NO | YES | YES | NO | NO | NO | WORKABLE |
| ASSISTED-RENEWAL CONTROL (NON-POST-INJECTION DPF RENEWAL CONTROL) | YES (NARROWED) | YES | YES | YES | NO | NO | WORKABLE |
| RESET-RENEWAL CONTROL (POST-INJECTION DPF RENEWAL CONTROL) | YES (NARROWED) | YES | YES | YES | YES | NO | WORKABLE |
| PARKED-RENEWAL CONTROL (POST-INJECTION DPF RENEWAL CONTROL) | YES (NARROWED) | YES | YES | YES | YES | YES (HIGH IDLE) | NOT WORKABLE |

FIG. 6

| SCR REFERENCE OPERATION RESTRICTING CONTROL | | INJECTION AMOUNT CONTROL | ROTATIONAL SPEED CONTROL | CONDITION | BUZZING |
|---|---|---|---|---|---|
| UREA WATER REMAINING AMOUNT OPERATION RESTRICTION CONTROL | FIRST STAGE | YES (LIMITED TO FIRST PRESET AMOUNT) | NO | REMAINING AMOUNT OF UREA WATER IS PRESET AMOUNT OR LESS | CONTINUOUS (PRESET PERIOD OF TIME) |
| | SECOND STAGE | YES (LIMITED TO SECOND PRESET AMOUNT) | YES (LIMITED TO LOW IDLING) | REMAINING AMOUNT OF UREA WATER IS PRESET AMOUNT OR LESS, AND UNABLE TO SUCK IN | CONTINUOUS (NON-STOP UNTIL REPLENISH) |
| SYSTEM ABNORMALITY OPERATION RESTRICTION CONTROL | FIRST STAGE | YES (LIMITED TO SECOND PRESET AMOUNT) | YES (MAXIMUM TORQUE ROTATIONAL SPEED IS LIMITED) | OPERATION PERIOD FROM OCCURRENCE OF ABNORMALITY IS FIRST PRESET PERIOD OR LONGER, BUT SHORTER THAN SECOND PRESET PERIOD | CONTINUOUS (PRESET PERIOD OF TIME) |
| | SECOND STAGE | YES (LIMITED TO SECOND PRESET AMOUNT) | YES (LIMITED TO LOW IDLING) | OPERATION PERIOD FROM OCCURRENCE OF ABNORMALITY IS SECOND PRESET PERIOD OR LONGER | CONTINUOUS (NON-STOP UNTIL REPLENISH) |

FIG. 7

| CONTROL WHOSE EXECUTION CONDITION IS ESTABLISHED | PREFERENTIALLY EXECUTED CONTROL |
|---|---|
| SCR REFERENCE OUTPUT RESTRICTING CONTROL  ----  SELF-RENEWAL CONTROL (NON-POST-INJECTION DPF RENEWAL CONTROL) | SCR REFERENCE OUTPUT RESTRICTING CONTROL |
| SCR REFERENCE OUTPUT RESTRICTING CONTROL  ----  ASSISTED-RENEWAL CONTROL (NON-POST-INJECTION DPF RENEWAL CONTROL) | SCR REFERENCE OUTPUT RESTRICTING CONTROL |
| SCR REFERENCE OUTPUT RESTRICTING CONTROL  ----  RESET-RENEWAL CONTROL (POST-INJECTION DPF RENEWAL CONTROL) | RESET RENEWAL (POST-INJECTION DPF RENEWAL CONTROL) |
| SCR REFERENCE OUTPUT RESTRICTING CONTROL  ----  PARKED-RENEWAL CONTROL (POST-INJECTION DPF RENEWAL CONTROL) | PARKED RENEWAL (POST-INJECTION DPF RENEWAL CONTROL) |

WORK VEHICLE INCLUDING DIESEL PARTICULATE FILTER (DPF) REGENERATION CONTROL

CROSS REFERENCES TO RELATED APPLICATIONS

This application is a national stage application pursuant to 35 U.S.C. 371 of International Application No. PCT/JP2018/027309, filed on Jul. 20, 2018 which claims priority under 35 U.S.C. § 119 to Japanese Patent Application No. 2017-147715 filed on Jul. 31, 2017, the disclosures of which are hereby incorporated by reference in their entireties.

TECHNICAL FIELD

The present invention relates to a work vehicle, such as an agricultural machine (e.g., tractor) and a construction machine, having an engine.

BACKGROUND ART

As described in Patent Literature 1 (hereinafter, PTL 1) for example, this type of work vehicle usually includes a DPF system configured to collect particulate matter (particulate matter may be hereinafter abbreviated and referred to as "PM") contained in exhaust gas from an engine by using a DPF (Diesel Particulate Filter) such as a soot filter, and a continuous regeneration type having an oxidation catalyst is adopted as the DPF system in many cases.

In such a DPF system, the PM is deposited in the soot filter over time. This deposition of PM, when exceeding a preset amount, increases distribution resistance of the soot filter, consequently leading to problems such as deterioration of PM collection performance and a drop in output of the engine. To address this, for example, a DPF renewal control is performed at a predetermined timing. The DPF renewal control restores the PM collection performance by, for example, changing an operating condition of the engine to increase the temperature of the exhaust gas so as to burn and remove the PM deposited in the soot filter by the exhaust gas from the engine.

A work vehicle described in Patent Literature 2 (hereinafter, PTL 2) is configured to execute, as the DPF renewal control: a non-post-injection DPF renewal control on a low-temperature side and a post-injection DPF renewal control on a high-temperature side. The non-post-injection DPF renewal control does not perform post-injection which is an injection of fuel after combustion stroke of the engine, whereas the post-injection DPF renewal control performs the post-injection.

When the amount of PM deposited exceeds a preset amount during work with the work vehicle, the non-post-injection DPF renewal control on the low-temperature side is automatically executed. In some cases, however, the amount of PM deposited does not decrease even if the non-post-injection DPF renewal control on the low-temperature side is performed. In such a case, the post-injection DPF renewal control on the high-temperature side is executed.

Meanwhile, as described in Patent Literatures 2 to 5 (hereinafter referred to as PTL 2 to PTL 5, respectively), the above-described type of work vehicle may include an SCR (Selective Catalytic Reduction) system which adds a reductant such as urea water stored in a reductant storage tank to the exhaust gas from the engine to reduce nitrogen oxide (nitrogen oxide may be hereinafter abbreviated as "NOx") contained in the exhaust gas.

Since the reductant stored in the reductant storage tank of such an SCR system keeps decreasing during operation of the engine, an SCR reference output restricting control is executed when a remaining amount of the reductant equals to or less than a preset amount. This SCR reference output restricting control restricts the operating condition of the engine (e.g., restricting the rotational speed or output) to save the reductant and delay running out of the reductant storage tank. The SCR reference output restricting control that restricts the operating condition of the engine is also performed in a case where an abnormality such as a breakdown of the SCR system takes place, so as to reduce an amount of emission of NOx-unremoved exhaust gas to the outside.

The work vehicles described in PTL 4 and PTL 5 each can suspend the SCR reference output restricting control when the SCR reference output restricting control is executed, by performing a special operation such as using a release key.

CITATION LIST

Patent Literature

PTL 1: Japanese Patent Application Laid-Open No. 2016-078600
PTL 2: Japanese Patent Application Laid-Open No. 2013-160104
PTL 3: Japanese Patent Application Laid-Open No. 2009-127521
PTL 4: Japanese Patent Application Laid-Open No. 2015-175264
PTL 5: International Publication No. 2015/025537

SUMMARY OF INVENTION

Technical Problem

In a case where the above-mentioned type of work vehicle includes both the DPF system and the SCR system, there is a possibility that both the DPF renewal control and the SCR reference output restricting control may be executed at the same time depending on the conditions of the DPF system and the SCR system, the DPF renewal control being control for restoring the PM collection performance by changing the operating condition of the engine to raise the temperature of the exhaust gas from the engine so as to burn and remove the PM deposited in the DPF system by using the exhaust gas from the engine, the SCR reference output restricting control restricting the operating condition of the engine.

However, when the DPF renewal control and the SCR reference output restricting control are executed at the same time, the operating condition of the engine is restricted even while the DPF renewal control is in progress. Due to this, the temperature of the exhaust gas from the engine may be lower than a temperature suitable for the DPF system renewal, and the DPF renewal control may not be properly executed. Failing to properly execute the DPF renewal control may lead to failure of the DPF system, leading to trouble of not being able to restart the engine and the like.

To avoid such critical trouble, it is conceivable to suspend the SCR reference output restricting control by using a release key and the like, in a case where the DPF renewal control is to be performed. This, however, requires a user to perform a special operation for suspending the SCR reference output restricting control every time the DPF renewal control is performed. This is a problem for the user because the user cannot concentrate on work such as agricultural work the user is supposed to do in the first place.

In view of the above circumstance, a main object of the present invention is to provide a work vehicle that can avoid failure of a DPF system attributed to improperly executed DPF renewal control, and that can properly operate the DPF system and an SCR system to favorably clean exhaust gas from an engine.

Solution to Problem

A first feature configuration of the present invention includes: a DPF system configured to collect particulate matter contained in exhaust gas from an engine;
  an SCR system configured to add, to the exhaust gas from the engine, a reductant stored in a reductant storage tank to reduce nitrogen oxide contained in the exhaust gas; and
  a control unit capable of executing a DPF renewal control whereby particulate matter collected and deposited in the DPF system is burned and removed by using the exhaust gas from the engine and an SCR reference operation restricting control to restrict an operating condition of the engine, the SCR reference operation restricting control executed when an amount of the reductant stored in the reductant storage tank is a preset value or less, or when an abnormality occurs in the SCR system, wherein
  the control unit is configured to preferentially execute the DPF renewal control over the SCR reference operation restricting control.

With this configuration, the exhaust gas from the engine can be properly purified by having the DPF system collect the particulate matter contained in the exhaust gas from the engine, and reducing the NOx contained in the exhaust gas from the engine through the SCR system.

By executing the DPF renewal control at a predetermined timing, the control unit changes the operating condition of the engine to raise the temperature of the exhaust gas from the engine so that the PM deposited in the DPF system can be burned and removed, and the PM collection performance of the DPF system can be restored. Further, when the reductant stored in the reductant storage tank is a preset amount or less, or when an abnormality occurs in the SCR system, the control unit executes the SCR reference operation restricting control to restrict the operating condition of the engine so that the reductant can be saved to delay running out of the reductant in the reductant storage tank, and an amount of emission of NOx-unremoved exhaust gas to the outside can be reduced.

Since the control unit preferentially executes the DPF renewal control over the SCR reference operation restricting control, the DPF renewal control can be properly executed to suitably renew the DPF system without a need for a special operation, even when an execution condition for the DPF renewal control and an execution condition for the SCR reference operation restricting control are established at the same time. Therefore, failure in the DPF system attributed to improperly-executed DPF renewal control can be avoided.

It should be noted that preferential execution of the DPF renewal control over the SCR reference operation restricting control means not only executing the DPF renewal control while not executing the SCR reference operation restricting control by, for example, stopping the SCR reference operation restricting control, but also executing the DPF renewal control while restricting execution of the SCR reference operation restricting control to such an extent that the DPF renewal control can be properly performed.

In a second feature configuration of the present invention, the control unit may be configured not to execute the SCR reference operation restricting control while the DPF renewal control is executed.

With the above configuration, the control unit does not execute the SCR reference operation restricting control while the DPF renewal control is executed. Therefore, the operating condition of the engine is not restricted by the SCR reference operation restricting control during execution of the DPF renewal control, and the DPF renewal control being executed can be properly executed until its termination. Therefore, failure in the DPF system caused by an improper execution status of the DPF renewal control during execution of the DPF renewal control can be avoided.

In a third feature configuration of the present invention, the control unit may be configured to stop the SCR reference operation restricting control and execute the DPF renewal control, when an execution condition for the DPF renewal control is established during execution of the SCR reference operation restricting control.

In the above configuration, even if the SCR reference operation restricting control is in progress, the control unit stops the SCR reference operation restricting control when the execution condition for the DPF renewal control is established, and executes the DPF renewal control. Therefore, the DPF renewal control can be properly executed even in such a case, without having the operating condition of the engine restricted by the SCR reference operation restricting control. Therefore, failure in the DPF system attributed to improperly-executed DPF renewal control during execution of the SCR reference operation restricting control can be avoided.

In a fourth feature configuration of the present invention, the control unit may be configured so as to resume the SCR reference operation restricting control, when the DPF renewal control having been executed while the SCR reference operation restricting control was stopped is terminated.

In the present configuration, after the DPF renewal control is properly executed without the operating condition of the engine being restricted by the SCR reference operation restricting control, the control unit automatically resumes the SCR reference operation restricting control to once again restrict the operating condition of the engine, so that the reductant can be saved to delay running out of the reductant from the reductant storage tank, and an amount of emission of NOx-unremoved exhaust gas to the outside can be reduced.

In a fifth feature configuration of the present invention, the control unit may be configured to be capable of executing, as the DPF renewal control, a non-post-injection renewal control on a low-temperature side in which a post-injection is not performed in the engine, and executing a post-injection renewal control on a high-temperature side in which post-injection is performed in the engine, and
  the control unit is configured not to preferentially execute the non-post-injection renewal control over the SCR reference operation restricting control, and configured to preferentially execute the post-injection renewal control over the SCR reference operation restricting control.

In the above configuration, the DPF system can be efficiently renewed by selectively executing the non-post-injection DPF renewal control on the low-temperature side and the post-injection DPF renewal control on the high-temperature side in the DPF renewal control; e.g., executing the post-injection DPF renewal control on the high-temperature side, when an amount of PM deposited is not reduced even if the non-post-injection DPF renewal control on the low-temperature side is executed.

In a case where the DPF renewal control to be executed is the non-post-injection renewal control on the low-temperature side, renewal is less urgent than in a case where the DPF renewal control to be executed is the post-injection renewal control on the high-temperature side. Therefore, it is thought that the DPF system will be unlikely to fail even if the DPF renewal control is not given the priority over the SCR reference operation restricting control.

In the above configuration, the control unit does not preferentially execute the non-post-injection renewal control on the low-temperature side over the SCR reference operation restricting control. Therefore, when the execution condition for the non-post-injection renewal control on the low-temperature side and the execution condition for the SCR reference operation restricting control are established at the same time, the SCR reference operation restricting control is executed, and the operating condition of the engine can be restricted.

On the other hand, the control unit preferentially executes the post-injection DPF renewal control on the high-temperature side over the SCR reference operation restricting control. Therefore, when the execution condition for the post-injection DPF renewal control on the high-temperature side and the execution condition for the SCR reference operation restricting control are established at the same time, the DPF renewal control can be properly executed and the DPF system which is likely to fail under such a situation can be properly renewed.

BRIEF DESCRIPTION OF DRAWINGS

FIG. 4 is a table showing types of a DPF renewal control.
FIG. 6 is a table showing types of SCR reference operation restricting controls.
FIG. 7 is a table showing a relationship (preferential relation) between the SCR reference operation restricting control and the DPF renewal control.

DESCRIPTION OF EMBODIMENTS

An embodiment of a work vehicle according to the present invention will be described based on the drawings.

The present embodiment describes an example where the work vehicle is a tractor; however, the work vehicle encompasses a riding type work vehicle as well as a walking-type work vehicle, such as a rice transplanter, a combine harvester, a civil engineering and construction work apparatus, a snow-plow, and the like, in addition to a tractor.

Figure 1:
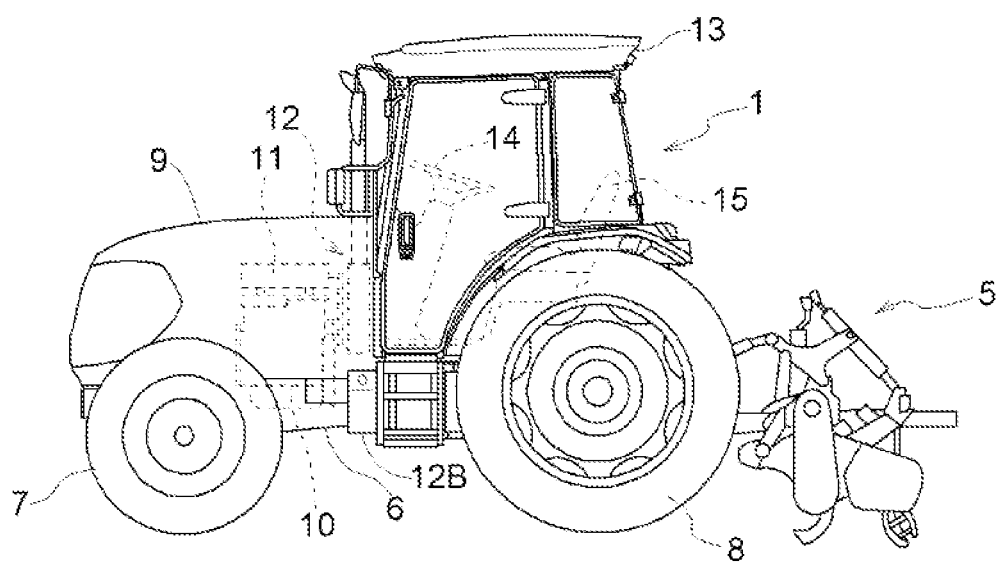
FIG. 1 is a side view of a tractor.

As shown in FIG. 1, the tractor 1 has a vehicle unit 6 to which a work machine 5 is attachable at the rear side of the vehicle unit 6. A front portion of the vehicle unit 6 is supported by a pair of left and right front wheels 7, whereas a rear portion of the vehicle unit 6 is supported by a pair of left and right rear wheels 8. In the front portion of the vehicle unit 6, an engine hood 9 is arranged, and an engine 10 (diesel engine) serving as a drive source is accommodated under the engine hood 9.

Figure 2:
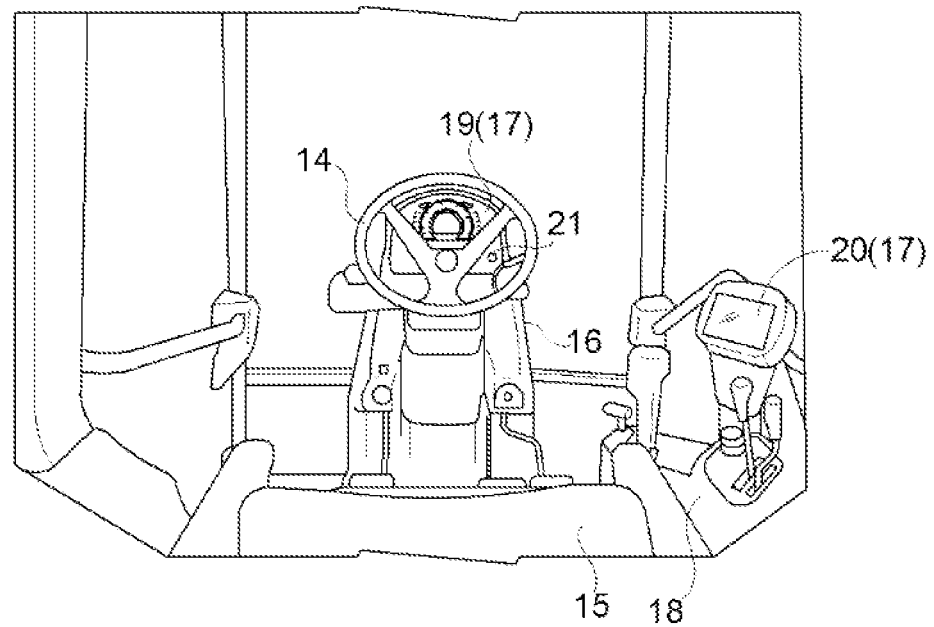
FIG. 2 is a diagram viewed frontward from a driver seat.

On the rear side of the engine hood 9, a cabin 13 for a user to board is arranged. In the cabin 13, a steering handle 14 for the user to perform steering operation, and a driver seat 15 for the user, and the like are arranged. Further, as shown in FIG. 2, in the cabin 13, a meter panel 19 and a monitor 20 are provided as a display unit 17 configured to display information about the tractor 1 to be visually confirmed by the user seated on the driver seat 15. The meter panel 19 is arranged on the upper side of a dashboard 16. The monitor 20 is arranged on the upper side of the operation panel 18 on the right side of the driver seat 15.

As shown in FIG. 1, the engine 10 has on its upper side a DPF system 11 configured to purify exhaust gas by capturing PM contained in the exhaust gas. On the rear side of the engine 10, an SCR system 12 is provided. The SCR system 12 is configured to reduce NOx contained in the exhaust gas from the engine 10 by adding to the exhaust gas from the engine 10 urea water (an example of the reductant) stored in a urea water storage tank (an example of the reductant storage tank) 12B. The following describes a schematic structure of the intake and exhaust of the engine 10 based on FIG. 3.

Figure 3:
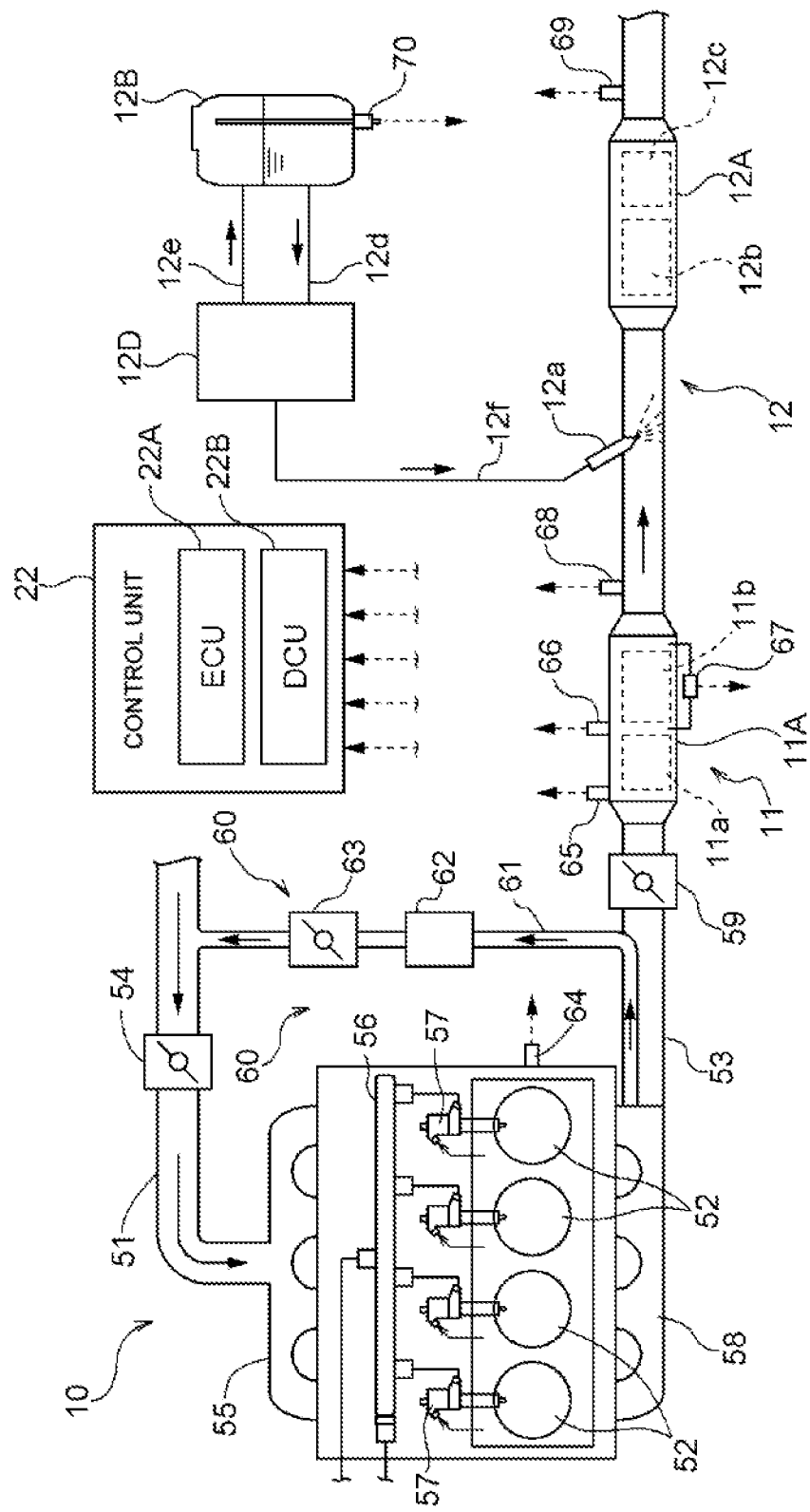
FIG. 3 is a block diagram of an engine.

The engine 10 includes an air-intake passage 51 configured to take in air from outside, combustion chambers 52 each configured to combust a fuel, and an exhaust passage 53 configured to emit exhaust gas from the combustion chamber 52 to the outside. It should be noted that, although FIG. 3 shows a four-cylinder engine 10 having four combustion chambers 52, the number of combustion chambers 52 can be suitably modified. In the air-intake passage 51, an air-intake valve 54 and an air-intake manifold 55 are arranged in this order from the upstream side relative to the direction in which the air flows. The air-intake valve 54 allows adjustment of air supply amount to the combustion chamber 52. The air-intake manifold 55 is configured to distribute air having taken in, into a plurality of combustion chambers 52.

The engine 10 includes a common rail 56 and an injector 57 for supplying fuel to the combustion chambers 52. To the common rail 56, the fuel is pressure-fed by a fuel pump (not shown). The injector 57 is arranged in each of the combustion chambers 52, and the high-pressure fuel stored in the common rail 56 is injected into the combustion chambers 52 at a predetermined timing.

In the exhaust passage 53, an exhaust gas manifold 58, an exhaust valve 59, the DPF system 11, and the SCR system 12 are arranged in this order from the upstream side relative to a direction in which the exhaust gas flows. The exhaust gas manifold 58 is configured to collect and discharge exhaust gas generated in the combustion chambers 52, and the exhaust valve 59 is configured to adjust the amount of exhaust gas discharged to the outside of the engine 10.

The DPF system 11 includes an oxidation catalyst 11a, a soot filter 11b in this order from the upstream side of the direction in which the exhaust gas flows, and the oxidation catalyst 11a and the soot filter 11b are accommodated in a DPF case 11A.

The oxidation catalyst 11a is configured to promote oxidation of carbon monoxide, nitrogen monoxide, and the like contained in the exhaust gas. The soot filter 11b is configured to capture, for example, PM such as soot contained in the exhaust gas. The PM collected and deposited by the soot filter 11b is burned and removed by performing a later-described DPF renewal control at suitable timing.

The SCR system 12 includes a urea water injection nozzle (an example of a reductant adding unit) 12a configured to add urea water serving as a reductant to the exhaust gas, and a selective reduction catalyst (SCR) 12b, and an ammonia slip suppression catalyst (ASC) 12c, in this order from the upstream side relative to the direction in which the exhaust gas flows. The selective reduction catalyst 12b and the ammonia slip suppression catalyst 12c are accommodated in a hollow SCR case 12A.

The selective reduction catalyst 12b is configured to selectively reduce NOx contained in the exhaust gas, in an atmosphere with the presence of ammonia (NH3) taken into the exhaust gas from the urea water.

The ammonia slip suppression catalyst 12c is made of an oxidation catalyst and the like such as platinum, and is configured to oxidize the selective reduction catalyst 12b having unexpectedly passed. By oxidizing the ammonia into nitrogen, nitrogen monoxide, water and the like, the ammonia is kept from being released outside.

The SCR system 12 includes the urea water storage tank 12B configured to store urea water serving as a reductant, and a urea water supply device (an example of reductant supply unit) 12D configured to draw out urea water from the urea water storage tank 12B and supplies the urea water to the urea water injection nozzle 12a. The urea water supply device 12D has a pump and the like, and is configured to suck in urea water from the urea water storage tank 12B through a urea water draw-out passage 12d and to supply the urea water to the urea water injection nozzle 12a through a urea water supply passage 12f. The urea water sucked in by the urea water supply device 12D is partially returned to the urea water storage tank 12B through a urea water return passage 12e. By injecting the urea water supplied by the urea water supply device 12D through the urea water draw-out passage 12d from the urea water injection nozzle 12a into the exhaust gas, the urea water is added to the exhaust gas.

It should be noted that the engine 10 includes an EGR device 60 and is configured to partially recirculate the exhaust gas to the air-intake side. The EGR device 60 has an EGR passage 61 through which the exhaust gas in the exhaust gas passage 53 is partially recirculated to the air-intake passage 51. The EGR passage 61 includes, in an order from the upstream side relative to the direction in which the exhaust gas flows, an EGR cooler 62 configured to cool the exhaust gas to be recirculated, and an EGR valve 63 that can adjust the amount of exhaust gas recirculated.

The engine 10 includes various sensors.

For example, the sensors provided are: an engine rotational speed sensor 64 configured to detect a rotational speed of the engine 10; an oxidation catalyst temperature sensor 65 configured to detect the temperature of the upstream side of the oxidation catalyst 11a in the DPF system 11; a soot filter temperature sensor 66 configured to detect the temperature of the upstream side of the soot filter 11b in the DPF system 11; a differential pressure sensor 67 configured to detect the differential pressure between the upstream side and the downstream side of the soot filter 11b in the DPF system 11, and the like.

Further, the sensors provided are: an upstream NOx sensor 68 configured to detect the concentration of the NOx contained in the exhaust gas between the upstream side of the selective reduction catalyst 12b of the SCR system 12 (upstream side of the urea water injection nozzle 12a to be exact) and downstream side of the soot filter 11b in the DPF system 11; a downstream NOx sensor 69 configured to detect the concentration of the NOx contained in the exhaust gas on the downstream side of the ammonia slip suppression catalyst 12c of the SCR system 12; a urea water remaining amount sensor 70 configured to detect a remaining amount of urea water in the urea water storage tank 12B of the SCR system 12; and a urea water supply pressure sensor (not shown) configured to detect the supply pressure of the urea water to the urea water injection nozzle 12a of the SCR system 12.

The control unit 22 includes an ECU (Engine Control Unit) 22A configured to essentially control an output status of the engine 10 and the DPF system 11, a DCU (Dosing Control Unit) 22B configured to control the SCR system 12, and the like.

The control unit 22 uses detected information from the various sensors, maps set in advance, and the like to control an air supply amount by the air-intake valve 54, an exhaust gas amount by the exhaust valve 59, the fuel injection timing and the fuel injection amount from the injectors 57, a recirculation amount by the EGR valve 63, and the like so that the output status of the engine 10 is a predetermined output status. For example, the control unit 22 controls the air supply amount by the air-intake valve 54, the exhaust gas amount by the exhaust valve 59, the fuel injection timing and the fuel injection amount from the injectors 57, the recirculation amount by the EGR valve 63, and the like so that the engine rotational speed detected by the engine rotational speed sensor 64 is a predetermined engine rotational speed.

Further, the control unit 22 uses detected information from the various sensors and the like to control the injection amount of urea water from the urea water injection nozzle 12a so that a removal rate of the NOx is a predetermined removal rate. For example, the control unit 22 estimates an amount of ammonia necessary to reduce NOx by the selective reduction catalyst 12b, bases on the concentration of the NOx concentration on the upstream side of the selective reduction catalyst 12b, which is detected by the upstream NOx sensor 68, thereby controlling the injection amount of the urea water injected from the urea water injection nozzle 12a. Further, the control unit 22 estimates a ratio of the NOx reduced by the selective reduction catalyst 12b, based on the NOx concentration on the downstream side of the selective reduction catalyst 12b, which is detected by the downstream NOx sensor 69, thereby performing a feedback correction of the injection amount of the urea water determined based on the detection value from the upstream NOx sensor 68.

As hereinabove described, in the DPF system 11, the PM is collected by the soot filter 11b. Therefore, the PM is deposited in the soot filter 11b.

To address this, the control unit 22 is capable of executing a DPF renewal control which changes the operating condition of the engine 10 at a predetermined timing to raise the temperature of the exhaust gas, so as to burn and remove the PM deposited in the soot filter 11b of the DPF system 11 and restore the PM collection performance of the DPF.

Further, as hereinabove described, in the SCR system 12, the urea water stored in the urea water storage tank 12B is injected from the urea water injection nozzle 12a. Therefore, the urea water stored in the urea water storage tank 12B keeps decreasing during an operation of the engine 10. When the urea water in the urea water storage tank 12B runs out, the urea water is no longer injected into the exhaust gas. This leads to a problem that the NOx contained in the exhaust gas is discharged as it is to the outside. Further, this problem of the NOx in the exhaust gas being discharged as it is to the outside also takes place when an abnormality such as failure occurs in the SCR system 12.

To address this problem, the control unit 22 is capable of performing an SCR reference output restriction control, when the amount of urea water stored in the urea water storage tank 12B becomes the preset amount or less and/or when an abnormality such as failure occurs in the SCR system 12B. This SCR reference output restricting control restricts an operating condition of the engine 10 such as the rotational speed, output, and the like of the engine 10, so as to save the urea water to delay running out of the urea water storage tank 12B and to reduce an amount of emission of NOx-unremoved exhaust gas to the outside.

The following describes the DPF renewal control and the SCR reference output restricting control.

<DPF Renewal Control>

Figure 5:
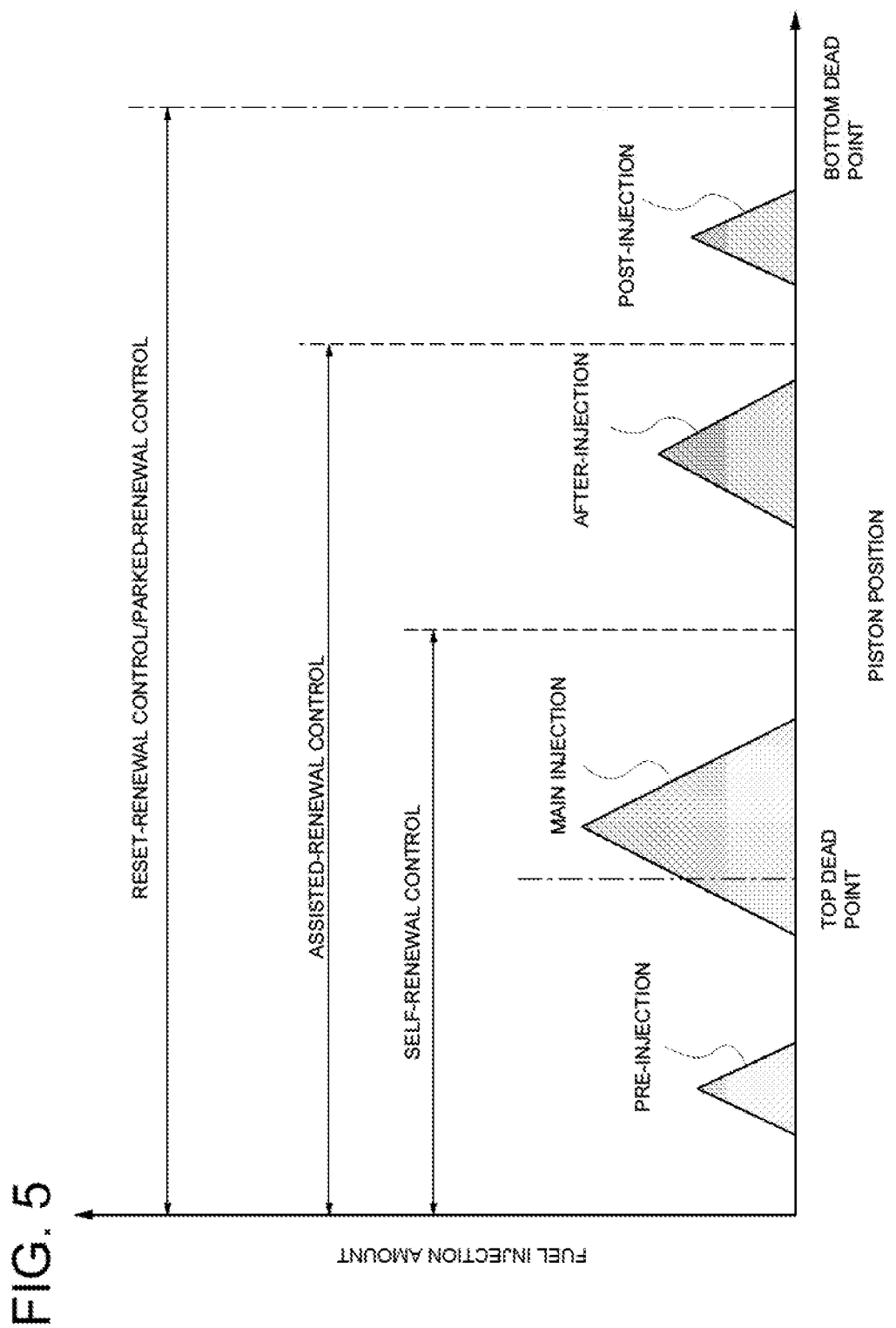
FIG. 5 is a diagram showing a relationship between a fuel injection amount and a piston position in a fuel control.

As shown in FIG. 4, the control unit 22 is capable of executing a self-renewal control, an assisted-renewal control, a reset-renewal control, and a parked-renewal control as the DPF renewal control. FIG. 5 shows what fuel control is performed in each if the self-renewal control, the assisted-renewal control, the reset-renewal control, and the parked-renewal control. In FIG. 5, the vertical axis represents the fuel injection amount, and the horizontal axis represents the piston position.

The self-renewal control and the assisted-renewal control each falls within a non-post-injection DPF renewal control, which is a renewal control that does not perform post-injection from the injector 57 in the later-detailed fuel control. Further, the reset-renewal control and the parked-renewal control each fall within a post-injection DPF renewal control, which is a renewal control that performs the post-injection from the injector 57 in the later-detailed fuel control.

Priority levels of the self-renewal control, the assisted-renewal control, the reset-renewal control, and the parked-renewal control, regarding which one of the controls is executed more preferentially to the others are configured as follows. Namely, if an amount of PM deposited in the soot filter 11b stays a preset amount or more even after the self-renewal control is performed, the control unit 22 performs the assisted-renewal control. If the amount of PM deposited in the soot filter 11b is not reduced after the assisted-renewal control is performed, the control unit 22 performs the reset-renewal control. Further, if the amount of PM deposited in the soot filter 11b is not reduced after the reset-renewal control is performed, the control unit 22 performs the parked-renewal control. While the self-renewal control, the assisted-renewal control, the reset-renewal control can be executed during work with the tractor 1, the parked-renewal control cannot be performed during work with the tractor 1.

(Self-Renewal Control)

The control unit 22 controls the engine 10 so that the operational state of the engine 10 is a predetermined operational state (an operational state suitable for driving by the user or suitable for work). Therefore, the temperature of the exhaust gas from the engine 10 (e.g., the temperature detected by the oxidation catalyst temperature sensor 65) is likely to be sufficiently high for burning and removing the PM. For example, in a work with a big load that requires an increase in the rotational speed of the engine 10, the rotational speed of the engine 10 is increased to be suitable for that work, and the temperature of the exhaust gas from the engine 10 is therefore sufficiently high for burning and removing the PM. In this case, by the control unit 22 performing a normal operation of the engine 10, the PM deposited in the soot filter 11b of the DPF system 11 is burned and removed in association with the operation of the engine 10. Therefore, as shown in FIG. 4 and FIG. 5, with the control unit 22 performing, as the fuel control, a main injection and a pre-injection immediately before the main injection from the injector 57 in the combustion stroke to perform normal operation of the engine 10, the self-renewal control is performed. An execution condition for the self-renewal control is that the control unit 22 causing the normal operation of the engine 10 and the like (e.g., an operation that increases the rotational speed of the engine 10 to a predetermined speed or higher). When this execution condition is established, the control unit 22 executes the self-renewal control.

(Assisted-Renewal Control)

An execution condition for the assisted-renewal control is, for example, the amount of PM deposited becoming a preset amount or more before or while the tractor 1 is traveling. When this execution condition is established, the control unit 22 executes the assisted-renewal control.

In the assisted-renewal control, as shown in FIG. 4 and FIG. 5, the control unit 22 adjusts the opening degree of the air-intake valve 54 towards a narrowing side as an air-intake amount control, and performs an after-injection immediately after the main injection as the fuel control, in addition to a pre-injection immediately before the main injection from the injector 57 in the combustion stroke. This way, the temperature in the DPF case 11A of the DPF system 11 (e.g., the temperature detected by the oxidation catalyst temperature sensor 65 or the soot filter temperature sensor 66) is controlled to be a preset temperature (e.g., 250° C. to 500° C.).

A stop condition for this assisted-renewal control is the amount of PM deposited becoming less than the preset amount or the execution condition (transition condition) of the later-described reset-renewal control or the parked-renewal control being established, during the assisted-renewal control. When the stop condition is established, the control unit 22 terminates the assisted-renewal control.

(Reset-Renewal Control)

An execution condition for the reset-renewal control is an execution of the reset-renewal control being instructed through a human operation of a renewal switch 21 (see FIG. 2). When this execution condition is established, the control unit 22 executes the reset-renewal control. In the present embodiment, for example, the control unit 22 flashes the renewal switch 21 to prompt the user to instruct execution of the reset-renewal control by operating the renewal switch 21, in a case where the amount of PM deposited does not become less than the preset amount even when the assisted-renewal control is executed for a preset period of time, or in a case where an accumulated driving time of the engine 10 after execution of the previous reset-renewal control becomes a preset period of time (e.g., 100 hours).

In the reset-renewal control, as shown in FIG. 4 and FIG. 5, the control unit 22 causes the injector 57 to perform a post-injection which is an injection of the fuel into the combustion chamber 52 after the combustion stroke, in addition to the assisted-renewal control, so as to bring the temperature inside the DPF case 11A to a preset temperature or higher (e.g., approximately 560 degrees).

A stop condition for this reset-renewal control is an elapse of a preset period of time (e.g., 30 min.) from the start of the reset-renewal control. When this stop condition is established, the control unit 22 terminates the reset-renewal control.

(Parked-Renewal Control)

An execution condition for the parked-renewal control is an execution of the parked-renewal control being instructed through a human operation of the renewal switch 21. When this execution condition is established, the control unit 22 executes the parked-renewal control. In the present embodiment, for example, in a case where the amount of PM deposited does not become less than the preset amount even when the reset-renewal control is executed for a preset period of time, the control unit 22 flashes the renewal switch 21 to prompt the user to instruct execution of the parked-renewal control by operating the renewal switch 21.

In the parked-renewal control, as shown in FIG. 4 and FIG. 5, the control unit 22, in addition to the reset-renewal control, increases the engine rotational speed while the tractor 1 is stopped so that the engine rotational speed is a high-idling engine rotational speed. This way, the temperature inside the DPF case 11A is controlled to become a preset temperature or higher (e.g., approximately 600 degrees).

A stop condition for this parked-renewal control is an elapse of a preset period of time (e.g., 30 min.) from the start of the parked-renewal control. When this stop condition is established, the control unit 22 terminates the parked-renewal control.

The following describes how the amount of PM deposited in the soot filter 11b is obtained.

A relationship of the amount of PM deposited for the differential pressure between the upstream side and the downstream side of the soot filter 11b is defined in advance through an experiment and the like. Using this pre-defined relationship of the amount of PM deposited for the differential pressure, the control unit 22 can obtain PM deposition amount information indicating the amount of PM deposited, based on the detected information of the differential pressure sensor 67. The amount of PM deposited can be also obtained, by subtracting a renewal amount of PM which is an amount of PM burned and removed from the DPF system 11 from the amount of PM discharged from the engine 10. Since the amount of PM discharged and the renewal amount of PM varies depending on the operational state of the engine 10, the relationship of the amount of PM discharged and the renewal amount of PM, relative to the operational state of the engine 10 can be defined in advance through an experiment and the like. Thus, by obtaining information about the operational state of the engine 10 such as detection information and the like from the engine rotational speed sensor 64, the control unit 22 can obtain the PM deposition amount information indicating the amount of PM deposited with reference to the pre-defined relationship between the amount of PM discharged and the renewal amount of PM with respect to the operational state of the engine 10.

<SCR Reference Output Restricting Control>

As shown in FIG. 6, the control unit 22 is capable of executing a urea water remaining amount operation restriction control and a system abnormality operation restriction control as the SCR reference output restricting control.

(Urea Water Remaining Amount Operation Restriction Control)

The urea water remaining amount operation restriction control is a control for restricting the operating condition of the engine 10, in a case where the remaining amount of the urea water in the urea water storage tank 12B detected by the urea water remaining amount sensor 70 (the remaining amount of the urea water indicated by a later-described bar graph 19d, 19f (see FIG. 12)) becomes a preset amount or less. In the present embodiment, the urea water remaining amount sensor 70 is configured with a level sensor that detects a liquid level inside the urea water storage tank 12B. Even when the remaining amount of the urea water is detected as to be 0%, the urea water storage tank 12B is not yet completely ran out at that time point of detection, and there is still a little amount of urea water remaining in the urea water storage tank 12B.

In view of this, the urea water remaining amount operation restriction control includes a first stage and a second stage. An execution condition for the first stage is, for example, the remaining amount of the urea water in the urea water storage tank 12B detected by the urea water remaining amount sensor 70 becoming a preset amount (e.g., 0%) or less. An execution condition for the second stage is, for example, the remaining amount of the urea water in the urea water storage tank 12B detected by the urea water remaining amount sensor 70 becoming the preset amount (e.g., 0%) or less and the urea water cannot be suitably drawn out (sucked in) from the urea water storage tank 12B. It should be noted that the state where the urea water cannot be suitably drawn out from the urea water storage tank 12B is for example, a state where the supply pressure of the urea water detected by the above-described urea water supply pressure sensor becomes less than a predetermined pressure.

When the execution condition for the first stage of the urea water remaining amount operation restriction control is established, the control unit 22 executes the first stage of the urea water remaining amount operation restriction control. When the execution condition for the second stage of the urea water remaining amount operation restriction control is established, the control unit 22 executes the second stage of the urea water remaining amount operation restriction control.

In the first stage of the urea water remaining amount operation restriction control, the control unit 22 restricts the operating condition of the engine 10 by restricting the injection amount of the fuel from the injector 57 to a first preset amount (e.g., 75%).

A stop condition for the first stage of the urea water remaining amount operation restriction control is, for example, the remaining amount of urea water becoming the preset amount or higher while the urea water remaining amount operation restriction control is executed, or the execution condition (transition condition) of the second stage of the urea water remaining amount operation restriction control being established. When the stop condition is established, the control unit 22 terminates the urea water remaining amount operation restriction control.

In the second stage of the urea water remaining amount operation restriction control, the control unit 22 further restricts the operating condition of the engine 10 as compared to the operating condition in the first stage. Namely, the control unit 22 restricts the fuel injection amount by the injector 57 to a second preset amount (e.g., 50%), which is lower than the first stage, and restricts the rotational speed of the engine 10 to a low-idling rotational speed which is slower than a normal idling rotational speed.

A stop condition for the second stage of the urea water remaining amount operation restriction control is, for example, the remaining amount of urea water becoming the preset amount or more while the urea water remaining amount operation restriction control is executed, or sucking in (drawing out) of the urea water from the urea water storage tank 12B actually becoming possible. When the stop condition is established, the control unit 22 terminates the second stage of the urea water remaining amount operation restriction control.

It should be noted that, when the remaining amount of the urea water becomes a preset warning value (e.g., 15%) or less, which is more than the preset amount (e.g., 0%) before the first stage of the urea water remaining amount operation restriction control is executed, an alarm buzzer (not shown) installed in the cabin 13 intermittently outputs an alarm sound for a predetermined period (e.g., 1 min.) to call for attention in advance. Then, while the first stage of the urea water remaining amount operation restriction control is executed, the alarm sound is continuously output for a predetermined period (e.g., 1 min.) from the alarm buzzer (not shown) installed in the cabin 13. When the second stage of the urea water remaining amount operation restriction control is executed, the alarm sound is continuously output from the alarm buzzer until the stop condition is established.

(System Abnormality Operation Restriction Control)

The system abnormality operation restriction control is a control for restricting the operating condition of the engine 10, when an operation period from an occurrence of an abnormality in the SCR system 12 becomes a preset period (e.g., 3 hours, or 10 min. in a case of recurrence) or longer. An example of the abnormality in the SCR system 12 is a situation where the detection value from the downstream NOx sensor 69 is not improved even though a predetermined amount or more of urea water is injected from the urea water injection nozzle 12a.

The system abnormality operation restriction control includes a first stage and a second stage. An execution condition for the first stage is, for example, the operation period of the engine 10 from the occurrence of an abnormality becoming a first preset period or longer, but shorter than a second preset period (e.g., 4 hours, or 30 min. in case of recurrence) which is longer than the first preset period. An execution condition for the second stage is, for example, the operation period of the engine 10 from the occurrence of the abnormality becoming the second preset period or longer.

When the execution condition for the first stage of the system abnormality operation restriction control is established, the control unit 22 executes the first stage of the system abnormality operation restriction control. When the execution condition for the second stage of the system abnormality operation restriction control is established, the control unit 22 executes the second stage of the system abnormality operation restriction control.

In the first stage of the system abnormality operation restriction control, the control unit 22 restricts the operating condition of the engine 10 by, restricting the fuel injection amount by the injector 57 to the second preset amount (e.g., 50%), and further restricting a maximum torque rotational speed of the engine 10 to a normal torque rotational speed.

A stop condition for the first stage of the system abnormality operation restriction control is, for example, the abnormality being solved during the execution of the system abnormality operation restriction control, or the execution condition (transition condition) of the second stage of the system abnormality operation restriction control being established. When the stop condition is established, the control unit 22 terminates the first stage of the system abnormality operation restriction control.

In the second stage of the system abnormality operation restriction control, the control unit 22 further restricts the operating condition of the engine 10 as compared to the operating condition in the first stage, by restricting the fuel injection amount by the injector 57 to the second preset amount (e.g., 50%), and further restricting the rotational speed of the engine 10 to the low-idling rotational speed.

A stop condition for the second stage of the system abnormality operation restriction control is, for example, the abnormality being solved during the execution of the system abnormality operation restriction control. When the stop condition is established, the control unit 22 terminates the second stage of the system abnormality operation restriction control.

It should be noted that, when the operation period of the engine 10 from the occurrence of the abnormality is shorter than the first preset period before the first stage of the system abnormality operation restriction control is executed, an alarm sound is intermittently output from the alarm buzzer for a predetermined period (e.g., 1 min.) so as to call for attention.

While the first stage of the system abnormality operation restriction control is executed, the alarm sound is continuously output from the alarm buzzer for a predetermined period (e.g., 1 min.). While the second stage of the system abnormality operation restriction control is executed, the alarm sound is continuously output from the alarm buzzer until the stop condition is established.

<Relationship Between DPF Renewal Control and SCR Reference Output Restricting Control>

The DPF renewal control is a control for restoring the PM collection performance of the DPF system 11, by changing the operating condition of the engine 10 to raise the temperature of the exhaust gas so as to burn and remove the PM deposited in the soot filter 11b of the DPF system 11 by using the exhaust gas. On the other hand, the SCR reference operation restricting control is a control for restricting the operating condition of the engine 10. Therefore, if the DPF renewal control is executed while the SCR reference operation restricting control is executed and the operating condition of the engine 10 is restricted, an increase in the temperature of the exhaust gas from the engine 10 is insufficient, and the PM collection performance of the DPF system 11 may not be properly restored.

Further, when the DPF renewal control to be executed is the non-post-injection renewal control on the low-temperature side, the DPF renewal is less urgent as compared to a case where the DPF renewal control to be executed is the post-injection renewal control on the high-temperature side. Therefore, in this case, the DPF system 11 is less likely to fail even if the DPF renewal control is not preferentially executed over the SCR reference operation restricting control.

Therefore, in this case, the control unit 22 preferentially executes the control defined in advance, when both the execution condition for the DPF renewal control and the execution condition for the SCR reference output restricting control are established.

As shown in two columns on the lower side of FIG. 7, when the execution condition for the post-injection DPF renewal control on the high-temperature side such as the reset-renewal control and the parked-renewal control is established together with the execution condition for the SCR reference output restricting control, the control unit 22 preferentially executes the post-injection DPF renewal control on the high-temperature side over the SCR reference output restricting control.

This way, when the execution condition for the post-injection DPF renewal control on the high-temperature side and the execution condition for the SCR reference operation restricting control are established at the same time, the post-injection DPF renewal control can be properly executed and the DPF system 11 in which failure is thought to be highly likely to take place.

As shown in two columns on the upper side of FIG. 7, when the execution condition for the non-post-injection DPF renewal control on the low-temperature side such as the self-renewal control and the assisted-renewal control is established together with the execution condition for the SCR reference output restricting control, the control unit 22 does not preferentially execute the non-post-injection DPF renewal control on the low-temperature side over the SCR reference output restricting control. It should be noted that the control unit 22 may be configured so as to execute in parallel the non-post-injection DPF renewal control and the SCR reference output restricting control, when the execution condition for the non-post-injection DPF renewal control and the execution condition for the SCR reference output restricting control are both established. However, the present embodiment deals with a case where the control unit 22 is configured to preferentially execute the SCR reference output restricting control over the non-post-injection DPF renewal control in such a circumstance.

This way, when the execution condition for the non-post-injection DPF renewal control on the low-temperature side and the execution condition for the SCR reference operation restricting control are established at the same time, the SCR reference operation restricting control can be properly executed to properly restrict the operating condition of the engine 10.

The following describes specific examples with reference to the flow charts of FIG. 8 to FIG. 11.

Figure 8:
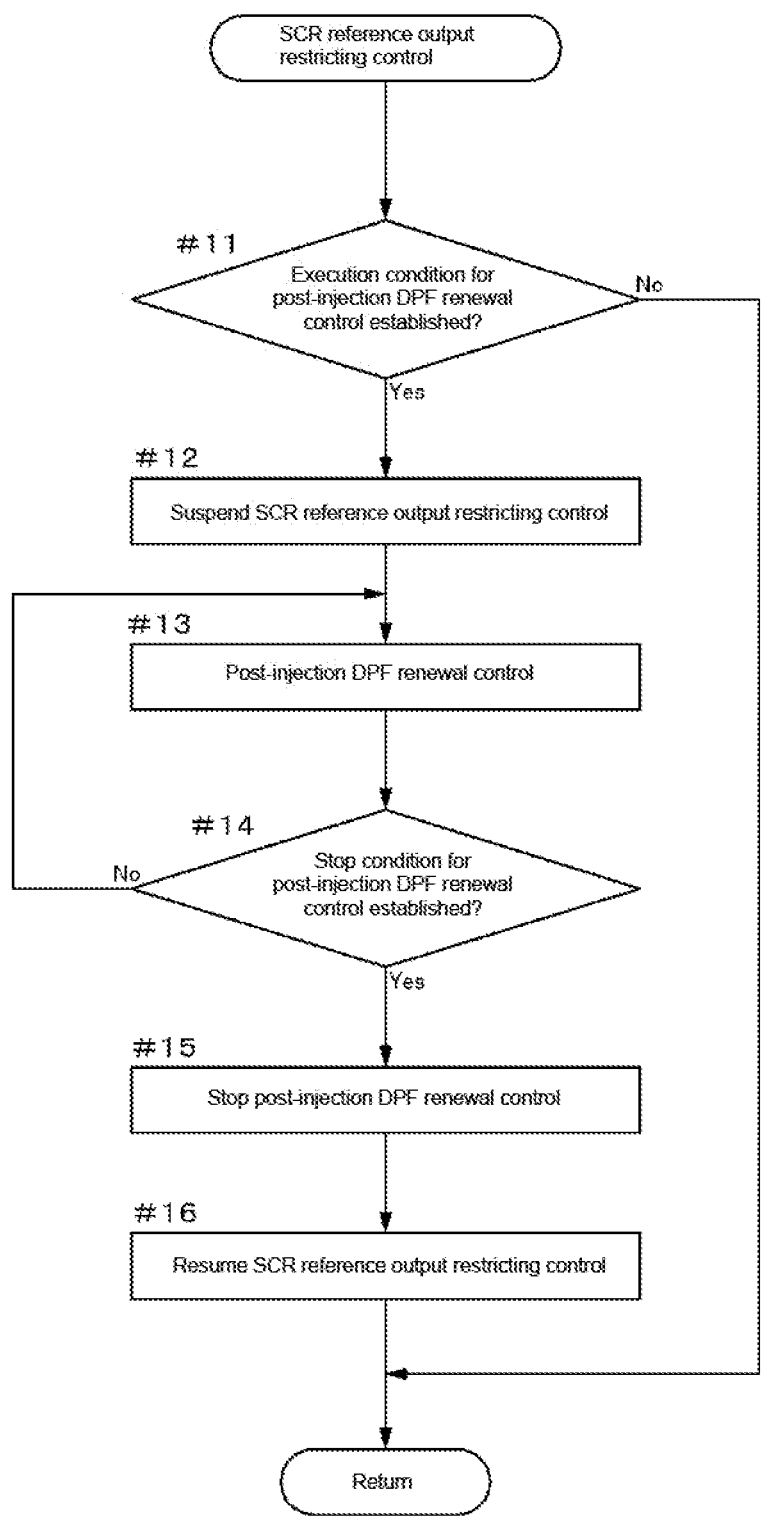
FIG. 8 is a diagram showing a control flow in a case where a post-injection DPF renewal condition is established during execution of the SCR reference operation restricting control.

FIG. 8 shows a control flow in a case where the execution condition for the post-injection DPF renewal control is established while the SCR reference operation restricting control is executed.

As shown in FIG. 8, when the execution condition for the post-injection DPF renewal control is established while the SCR reference operation restricting control is executed, the SCR reference operation restricting control is suspended and the post-injection DPF renewal control is executed (Yes in Step #11, Step #12, Step #13).

Then, when the stop condition for the post-injection DPF renewal control, such as elapse of the preset period of time, is established, the post-injection DPF renewal control is stopped, and the SCR reference operation restricting control is resumed (Yes in Step #14, Step #15, Step #16).

If the post-injection DPF renewal control is the reset-renewal control in the control flow of FIG. 8, for example, whether the execution condition for the parked-renewal control is established is confirmed after the reset-renewal control is stopped (between Step #15 and Step #16). If the execution condition for the parked-renewal control is established, the parked-renewal control can be executed continuously to the reset-renewal control.

Figure 9:
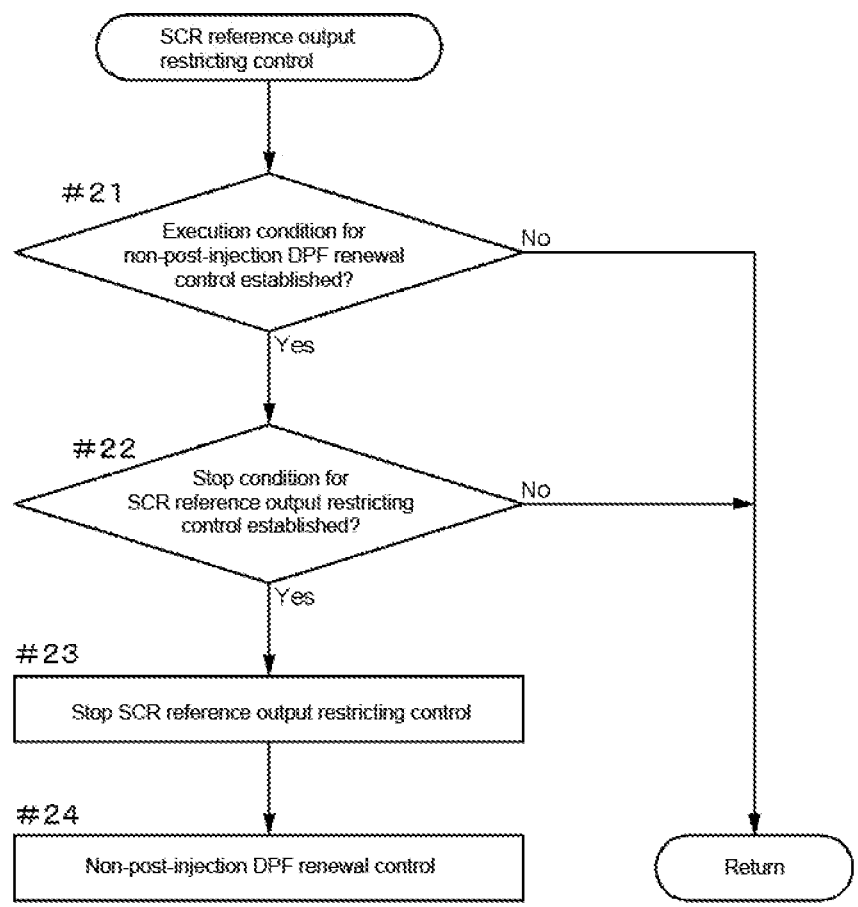
FIG. 9 is a diagram showing a control flow in a case where a non-post-injection DPF renewal condition is established during execution of the SCR reference operation restricting control.

FIG. 9 shows a control flow in a case where the execution condition for the non-post-injection DPF renewal control is established while the SCR reference operation restricting control is executed.

As shown in FIG. 9, when the execution condition for the non-post-injection DPF renewal control is established while the SCR reference operation restricting control is executed, the SCR reference operation restricting control is continued while the stop condition for the SCR reference operation restricting control is not established (Yes in Step #21, No in Step #22, Return).

Then, when the stop condition for the SCR reference operation restricting control is established, the SCR reference operation restricting control is stopped and the non-post-injection DPF renewal control is executed (Yes in Step #22, Step #23, Step #24).

Figure 10:
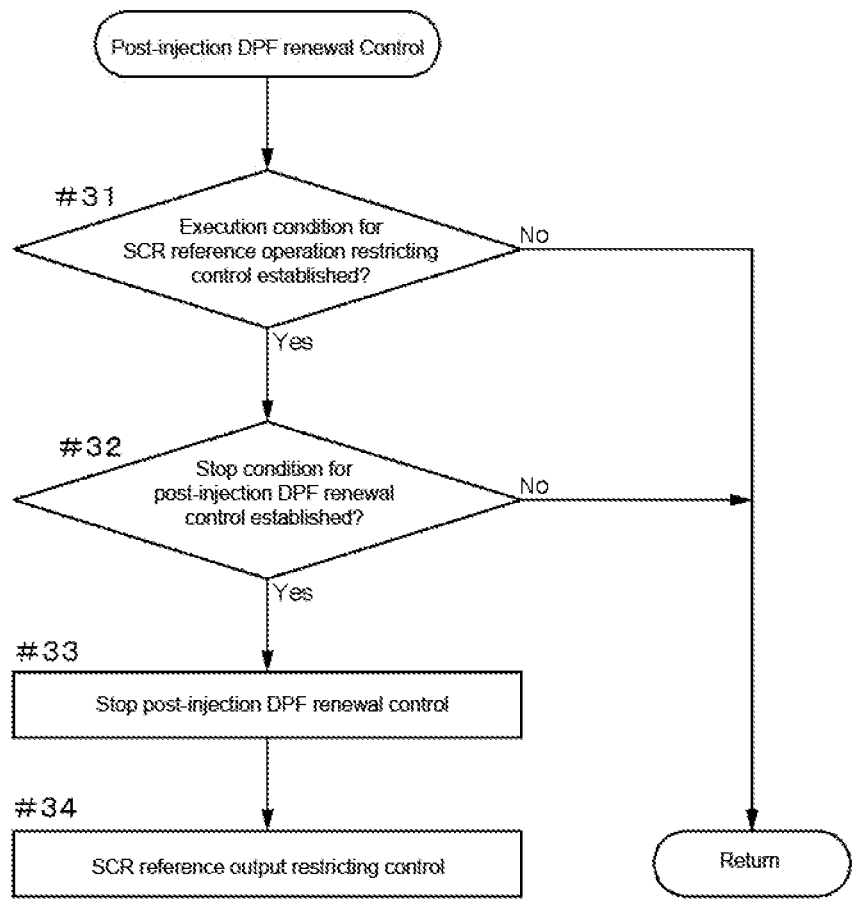
FIG. 10 is a diagram showing a control flow in a case where an SCR reference operation restricting condition is established during execution of the post-injection DPF renewal control.

FIG. 10 shows a control flow in a case where the execution condition for the SCR reference operation restricting control is established while the post-injection DPF renewal control is executed.

As shown in FIG. 10, when the execution condition for the SCR reference operation restricting control is established while the post-injection DPF renewal control is executed, the post-injection DPF renewal control is continued while the stop condition for the post-injection DPF renewal control is not established (Yes of Step #31, No in Step #32, Return).

Then, when the stop condition for the post-injection DPF renewal control, such as elapse of the preset period of time, is established, the post-injection DPF renewal control is stopped, and the SCR reference operation restricting control is executed (Yes in Step #32, Step #33, Step #34).

Figure 11:
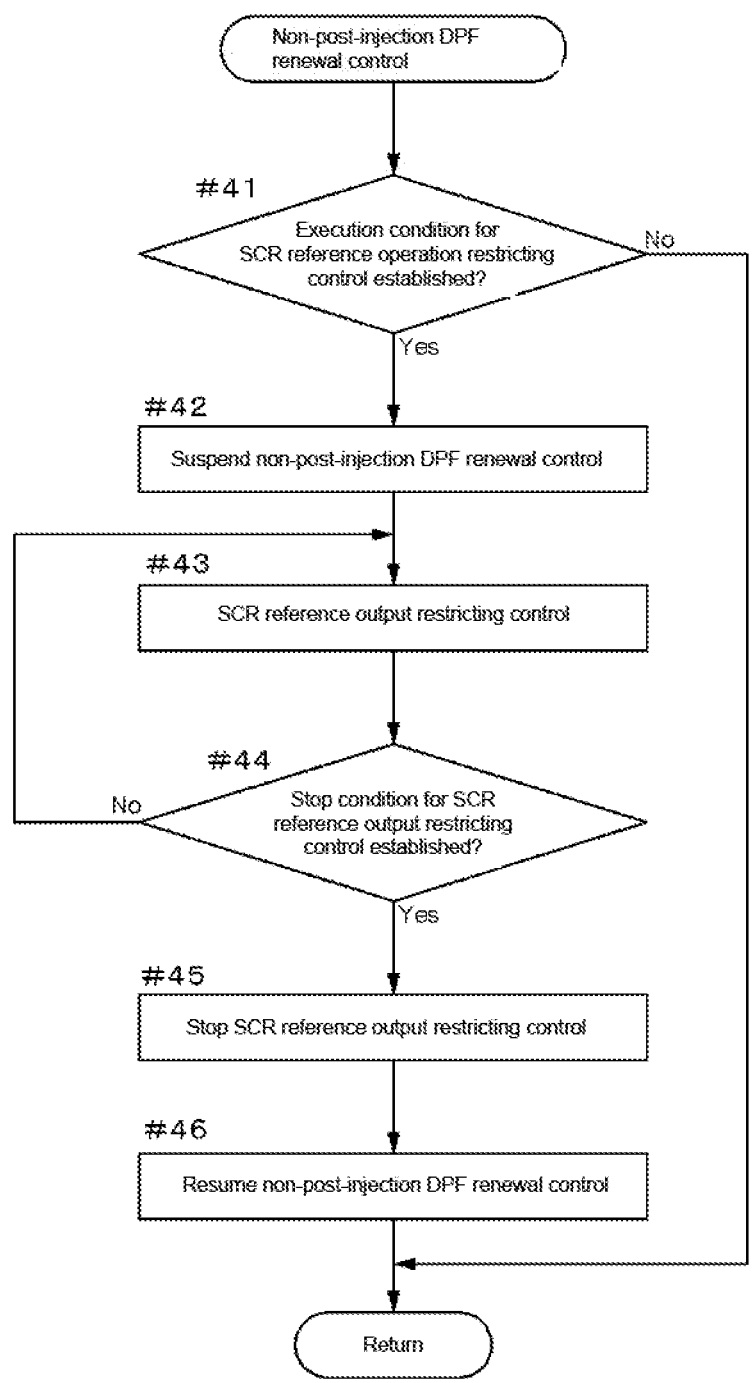
FIG. 11 is a diagram showing a control flow in a case where an SCR reference operation restricting condition is established during execution of the non-post-injection DPF renewal control.

FIG. 11 shows a control flow in a case where the execution condition for the SCR reference operation restricting control is established while the non-post-injection DPF renewal control is executed. In this case, the SCR reference operation restricting control may be executed while the non-post-injection DPF renewal control is executed. However, the present embodiment deals with a case where the non-post-injection DPF renewal control is stopped and the SCR reference operation restricting control is executed.

As shown in FIG. 11, when the SCR reference operation restricting condition is established while the non-post-injection DPF renewal control is executed, the non-post-injection DPF renewal control is suspended, and the SCR reference operation restricting control is executed (Step #41, Step #42, Step #43).

Then, when the stop condition for the SCR reference operation restricting control is established and the SCR reference operation restricting control is stopped, the non-post-injection DPF renewal control is resumed (Yes in Step #44, Step #45, Step #46).

FIG. 8 and FIG. 10 each shows a control flow of the post-injection DPF renewal control. Since it is the reset-renewal control and the parked-renewal control that falls within the post-injection DPF renewal control as hereinabove described, the control flows shown in FIG. 8 and FIG. 10 are each a control flow of the reset-renewal control and the parked-renewal control. FIG. 9 and FIG. 11 each show a control flow of the non-post-injection DPF renewal control. Since it is the self-renewal control and the assisted-renewal control that fall within the non-post-injection DPF renewal control as hereinabove described, the control flows shown in FIG. 9 and FIG. 11 are each a control flow of the self-renewal control and the assisted-renewal control.

<Example of Display on Display Unit>

As described hereinabove, the meter panel 19 and the monitor 20 are provided as the display unit 17 in the cabin 13. In this tractor 1, the remaining amount of urea water in the urea water storage tank 12B, the content of the SCR reference output restricting control, and the like can be displayed on the display unit 17 as information about the SCR system 12. The following describes an example of display on the display unit 17, mainly on the content related to the SCR system 12. A display control of the display unit 17 is executed by the control unit 22, and the like.

(Display Example of Normal Occasion)

Figure 12A:
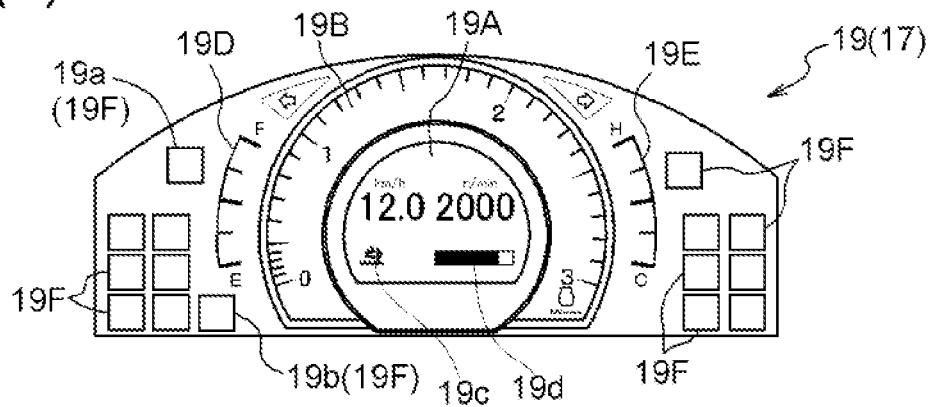
FIG. 12(a), FIG. 12(b) and FIG. 12(c) are diagrams showing exemplary displays on a display unit on a normal occasion.

FIG. 12(a) shows the meter panel 19 on a normal occasion. This meter panel 19 has a liquid crystal panel 19A configured to display text, a figure, and the like in its center display area. On the outer circumference side of the liquid crystal panel 19A, an engine speed indicator 19B is arranged, the engine speed indicator 19B is configured to indicate the rotational speed of the engine 10 by using a pointer. On the left side of the engine speed indicator 19B of the meter panel 19, a fuel meter 19D is arranged. The fuel meter 19D is configured to indicate the remaining amount of fuel by using a pointer. On the right side of the engine speed indicator 19B, a water temperature meter 19E is arranged. The water temperature meter 19E is configured to indicate the temperature of cooling water of the engine 10 by using a pointer. Further, on outside areas on the left and right sides of the meter panel 19, a plurality of indication lamps 19F and the like for indications and warnings in relation to a traveling system and a work system are arranged.

On a normal occasion, text indicating the vehicle speed, the rotational speed of the engine 10, and the like are displayed in an upper side area of the liquid crystal panel 19A. On a lower side area of the liquid crystal panel 19A, a urea water remaining amount mark portion 19c and a bar graph 19d are displayed. The urea water remaining amount mark portion 19c shows it is an indication of the remaining amount of the urea water in the urea water storage tank 12B. The bar graph 19d indicates the remaining amount of the urea water in the urea water storage tank 12B which is detected by the urea water remaining amount sensor 70. The left end portion of the bar graph 19d is 0%, and the right end portion of the bar graph 19d is 100%. An area darkened indicates the remaining amount of the urea water. The entire bar graph 19d is white in an empty state, and the entire bar graph 19d is darkened in a full state. The darkened portion is continuous from the left end portion to the right side, between the empty state and the full state. As described, on a normal occasion, the remaining amount of the urea water in the urea water storage tank 12B is indicated on the liquid crystal panel 19A, so that the user can frequently confirm the remaining amount of the urea water, and replenish the urea water at suitable timing.

Figure 12B:
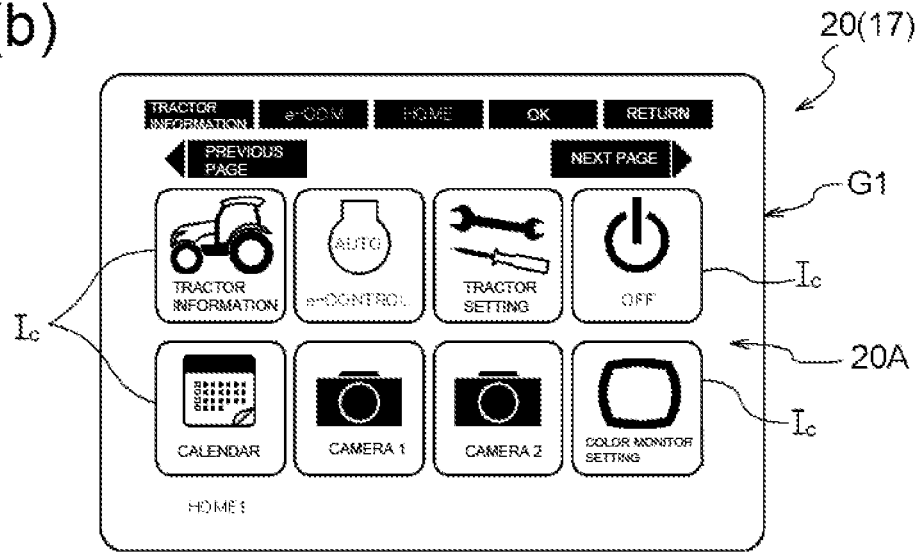

FIG. 12(b) shows a display state of a menu screen G1 displayed on the monitor 20 in a normal occasion. In a center display area 20A of the menu screen G1, a tractor information screen, a setting screen, and a plurality of icons Ic are displayed. The tractor information screen is for the user to confirm information about the tractor. The icons Ic are for instructing a transition to a setting screen and the like for various settings of the tractor 1 and the monitor 20. When the user instructs a transition to a specific icon Ic through an operation of an operation unit (not shown) and the like, the screen transits to a screen corresponding to the icon Ic to which transition is instructed.

Figure 12C:
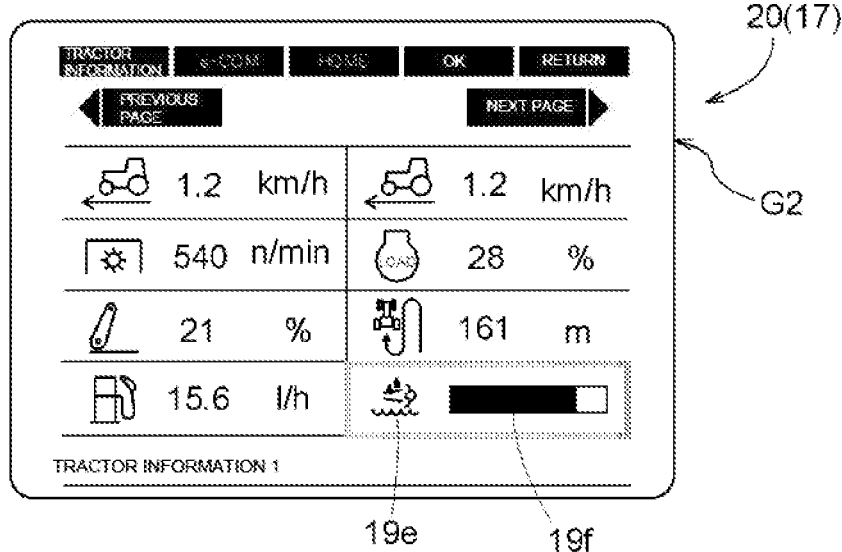

FIG. 12(c) shows a tractor information screen G2 having transited from the menu screen G1. This tractor information screen G2 indicates: information such as a continuous-distance-to-empty, which is a distance the tractor 1 can travel without refueling, and fuel consumption; a urea water remaining amount mark portion 19e showing it is an indication of the remaining of urea water in the urea water storage tank 12B; and a bar graph 19f indicating the remaining amount of urea water in the urea water storage tank 12B, which is detected by the urea water remaining amount sensor 70. The left end portion of the bar graph 19f is 0%, and the right end portion of the bar graph 19f is 100%. An area darkened indicates the remaining amount of the urea water. The entire bar graph 19f is white in an empty state, and the entire bar graph 19f is darkened in a full state. The darkened portion is continuous from the left end portion to the right side, between the empty state and the full state. As described, on a normal occasion, the remaining amount of urea water in the urea water storage tank 12B is also indicated in the tractor information screen G2 of the monitor 20. Therefore, the user can suitably confirm the remaining amount of the urea water.

(Display Example During Execution of SCR Reference Operation Restricting Control)

Figure 13A:
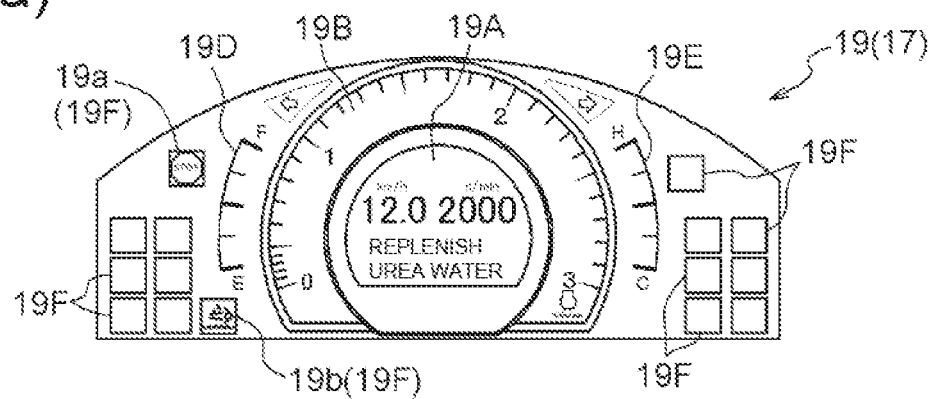
FIG. 13(a), FIG. 13(b) and FIG. 13(c) are diagrams showing exemplary displays on the display unit during execution of the SCR reference operation restricting control.

FIG. 13(a) shows the meter panel 19 while the second stage of the urea water remaining amount operation restriction control is executed, as an example of display during execution of SCR reference operation restricting control. On the lower side areas of the liquid crystal panel 19A of the meter panel 19, text reading "Replenish urea water" and the like is displayed to prompt the user to replenish urea water. Further, of the plurality of lamps 19F arranged in the outside area on the left and right sides of the meter panel 19, an indication lamp 19a prompting stopping of the tractor 1 and an indication lamp 19b indicating the remaining amount of urea water running short are flashed. Therefore, the user can easily perceive that urea water needs to be replenished.

Figure 13B:
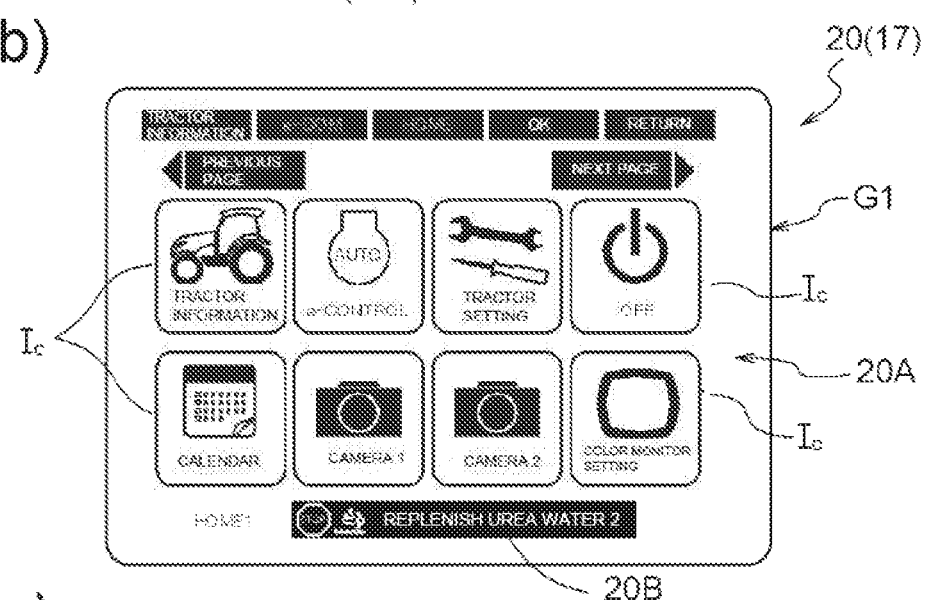
Figure 13C:
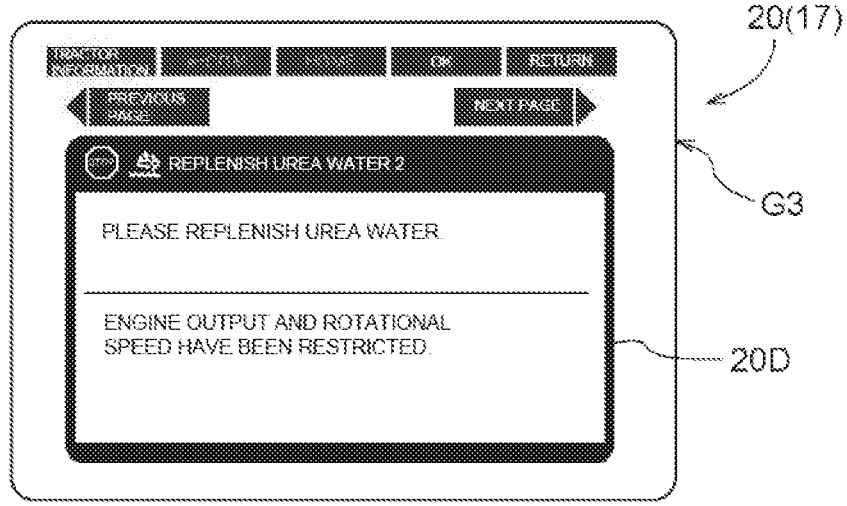

Further, for example, text reading "Replenish water 2" or the like is displayed in a display area 20B on the lower end side of the menu screen G1 of the monitor 20, as shown in FIG. 13(b) to prompt the user to replenish urea water. When the user selects the display area 20B by operation of the operation unit and the like, the display transits to a detail screen G3 as shown in FIG. 13(c). In an enlarged display area 20D at the center of the detail screen G3, text reading "Please replenish urea water" or the like is largely displayed to prompt the user to replenish urea water. Further, text reading "engine output and rotational speed are restricted" is largely displayed to indicate the second stage of the urea water remaining amount operation restriction control is executed. Therefore, the user can easily recognize the situation requires replenishing of urea water, and the second stage of the SCR reference operation restricting control is executed.

Similarly, during the first stage of the urea water remaining amount operation restriction control, the meter panel 19 and the monitor 20 also display an indication to prompt replenishing of the urea water, and an indication that the first stage of the SCR reference operation restricting control is executed, although specific content of display is different. Although illustration is omitted, for example, text reading "Replenish water 1" or the like is displayed in a display area 20B on the lower end side of the menu screen G1 of the monitor 20 to prompt the user to replenish urea water. In an enlarged display area 20D at the center of the detail screen G3 displayed after transition caused by operation on the operation unit or the like, text reading "Please replenish urea water" or the like is largely displayed to prompt the user to replenish urea water. Further, text reading "Engine output is restricted" is largely displayed to indicate the first stage of the urea water remaining amount operation restriction control is executed.

Similarly in the first stage and the second stage of the system abnormality operation restriction control, the meter panel 19 and the monitor 20 displays an indication prompting to solve the system abnormality, and an indication that the first stage or the second stage of the system abnormality operation restriction control is executed, although specific content of display is different.

Similarly at a time of calling for attention by outputting alarm sound from the alarm buzzer before the first stage of the urea water remaining amount operation restriction control or the system abnormality operation restriction control is executed, the meter panel 19 and the monitor 20 display an indication prompting replenishing of urea water or prompting to solve the system abnormality, and an indication to notify beforehand the first stage of the urea water remaining amount operation restriction control or the system abnormality operation restriction control will be executed.

Further, while the DPF renewal control is executed, for example, there is a display of an indication prompting execution of the post-injection DPF renewal control (reset renewal or parked renewal and the like) by operation of the renewal switch 21, and an indication that the DPF renewal control of any type is executed.

Other Embodiments (1) The above-described embodiment deals with a case where the control unit 22 is configured to preferentially execute a specific DPF renewal control (post-injection DPF renewal control) over the SCR reference operation restricting control. However, any type of the DPF renewal control that changes the operational state of the engine 10 from its normal occasion may be preferentially executed over the SCR reference operation restricting control.

(2) The above-described embodiment deals with a case where the control unit 22 is configured to preferentially execute the reset-renewal control and the parked-renewal control as the DPF renewal control over the SCR reference operation restricting control. However, of the reset-renewal control and the parked-renewal control, it may be only the parked-renewal control with higher urgency, which is preferentially executed over the SCR reference operation restricting control.

(3) The above-described embodiment deals with a case where the control unit 22 preferentially executes the DPF renewal control over the SCR reference operation restricting control, and the control unit 22 executes the DPF renewal control while, for example, stopping the SCR reference operation restricting control and not executing the SCR reference operation restricting control. However, the control unit 22 may be configured to execute the DPF renewal control, and execute the SCR reference operation restricting control while restricting the SCR reference operation restricting control to a range that the DPF renewal control can be properly executed.

INDUSTRIAL APPLICABILITY

The present invention can be suitably applied to various types of work vehicles having an engine.

REFERENCE SIGNS LIST

1 tractor (work vehicle)
10 engine
11 DPF system
12 SCR system
12B urea water storage tank (reductant storage tank)
22 control unit

The invention claimed is:

1. A work vehicle, comprising:
   a diesel particulate filter (DPF) system configured to collect particulate matter contained in exhaust gas from an engine;
   a selective catalytic reduction (SCR) system including a reductant stored in a reductant storage tank, the SCR system configured to add the reductant to the exhaust gas so as to reduce nitrogen oxide contained in the exhaust gas; and
   a control unit configured to:
      execute a DPF renewal control whereby particulate matter collected and deposited in the DPF system is burned and removed using heat from the exhaust gas, and
      execute an SCR reference operation restricting control configured to restrict a fuel injection amount of an injector, restrict a rotational speed of the engine, restrict a maximum torque rotational speed of the engine, or reduce an output of the engine when an amount of the reductant stored in the reductant storage tank is a preset amount or less or when an abnormality occurs in the SCR system,
   wherein the control unit is further configured to prioritize the DPF renewal control over the SCR reference operation restricting control.

2. The work vehicle according to claim 1, wherein the control unit is further configured to inhibit the SCR reference operation restricting control while the DPF renewal control is being executed.

3. The work vehicle according to claim 1, wherein, when an execution condition of the DPF renewal control is established during the execution of the SCR reference operation restricting control, the control unit is further configured to suspend the SCR reference operation restricting control and execute the DPF renewal control.

4. The work vehicle according to claim 3, wherein, when the DPF renewal control is completed during the suspension of the SCR reference operation restricting control, the control unit is further configured to resume the SCR reference operation restricting control.

5. The work vehicle according to claim 1, wherein:
   the DPF renewal control is an active DPF renewal control configured to perform post-injection of fuel into the engine.

* * * * *